United States Patent [19]

Conacher, Jr.

[11] 3,871,911

[45] Mar. 18, 1975

[54] NON-DISCOLORING PAINTED POLYURETHANE

[75] Inventor: Philip Conacher, Jr., Wilmington, Del.

[73] Assignee: E. I. du Pont de Nemours and Company, Wilmington, Del.

[22] Filed: June 1, 1973

[21] Appl. No.: 365,978

[52] U.S. Cl. 117/138.8 D, 117/161 K, 117/161 KP, 117/161 UZ, 117/161 UC
[51] Int. Cl. ............................................... B44d 1/02
[58] Field of Search....... 117/47 A, 138.8 D, 161 K, 117/161 KP, 161 UZ, 161 UC; 260/75 NH, 77.5 AM

[56] References Cited
UNITED STATES PATENTS

| | | | |
|---|---|---|---|
| 3,188,302 | 6/1965 | Lorenz | 260/77.5 |
| 3,194,793 | 7/1965 | Kogon | 260/77.5 |
| 3,310,533 | 3/1967 | McElory | 260/77.5 |
| 3,401,143 | 9/1968 | Finelli et al. | 260/40 |
| 3,755,261 | 8/1973 | Van Gulick | 260/77.5 AM |
| 3,764,370 | 10/1973 | Bragole | 117/47 A |

*Primary Examiner*—P. E. Willis, Jr.

[57] ABSTRACT

The product which results from curing an NCO-terminated urethane prepolymer with a methylene dianiline-salt complex at an $NCO/NH_2$ ratio greater than one is coated with a flexible coating or paint.

10 Claims, No Drawings

NON-DISCOLORING PAINTED POLYURETHANE

BACKGROUND OF THE INVENTION

It has been known in the past to coat or paint various polyurethanes with a wide variety of flexible coatings or paints which include acrylic enamels, alkyl enamels, urethane lacquers and two-part urethane enamels. There has, however, been a major problem associated with the use of these coatings or paints where applied to certain classes of polyurethane. In particular, coatings applied to amine-cured type began to discolor when exposed to the atmosphere (particularly sunlight) after a relatively short period of time, e.g. a few hours to several months. Such discoloration makes it extremely difficult to use the painted or coated polyurethanes in several significant areas; for instance, when utilizing the coated or painted polyurethane in various automobile parts the tendency of the coating or paint to discolor is most undesirable.

In so far as particularly desirable physical properties are often obtained by the use of amine curing agents there is a need for a painted or coated amine-cured polyurethane which is resistant to discoloration.

SUMMARY OF THE INVENTION

According to this invention it has unexpectedly been found that a polyurethane which is prepared by curing an NCO-terminated prepolymer with a complex of 4,4'-methylene dianiline and a designated alkali salt, preferably sodium chloride or lithium chloride may be painted or coated with a flexible paint or coating to produce a painted or coated polyurethane which is resistant to discoloration. The instant invention is also intended to include polyurethanes which are prepared by the one-shot method and cured with a complex of 4,4'-methylene dianiline and an alkali metal salt such as sodium chloride.

Briefly, the one-shot method involves simultaneously mixing and reacting one or more polyols, one or more polyisocyanates and the complex of 4,4'-methylene dianiline and salt. During the reaction the ratio of NCO/NH$_2$ groups is more than one; this is accomplished by employing an excess of the isocyanate. The preferred flexible coatings or paints which may be utilized are acrylic enamels, alkyl enamels, urethane lacquers and two-part urethane enamels.

In the curing of the prepolymer, a polymer is formed by heating the urethane prepolymer in the presence of the curing agent described herein to a temperature of about 90°–190°C. to transform the viscous liquid prepolymer, which generally has an average molecular weight less than about 3000 to a solid having a molecular weight in excess of about 10,000. The solids range from rubbery materials to hard plastics with a wide variety of uses, e.g. machine parts, exterior automotive fascia.

DETAILED DESCRIPTION

In more detail, the polyurethanes which are to be coated or painted according to the instant invention may be formed by one of two techniques, a one-shot technique or a prepolymer technique. The prepolymer technique is preferred. To form the prepolymer which is the precursor of the polyurethane, one must first react a polyether polyol or a polyester polyol with a molar excess of organic diisocyanate, thereby forming a prepolymer having terminal isocyanato groups. The prepolymer is then cured to increase its molecular weight from less than about 3000 to upwards of about 10,000.

Examples of such prepolymers are to be found in U.S. Pat. Nos. 2,620,516; 2,777,831; 2,843,568; 2,866,774; 2,900,368; 2,929,800; 2,948,691; 2,948,797; 3,114,735 and 3,188,302; the disclosures of these patents are herein incorporated by reference.

The curing agent is prepared by forming a complex between the 4,4'-methylene dianiline and a salt, the salt being selected from nitrites and halides (except the fluorides) of sodium and lithium, and sodium cyanide. Specifically, the compositions to be utilized as curing agents for these amine-curable prepolymers include the reaction products of 4,4'-methylene dianiline with the following salts, in the ratio of 3 moles of methylene dianiline to one mole of salt: sodium chloride, sodium bromide, sodium iodide, sodiun nitrite, lithium chloride, lithium bromide, lithium iodide, lithium nitrite and sodium cyanide.

There is a variety of methods for preparing these complexes.

In one method for preparing the complexes of this invention, an aqueous solution of brine containing a sodium or lithium salt selected from the class consisting of the chloride, bromide, iodide and nitrite is reacted with 4,4'-methylene dianiline (also referred to hereinafter as MDA), either in a solvent, having a degree of mutual solubility for both water and for the MDA, such as an alcohol, or with solid MDA in the substantial absence of a solvent. If the salt is present in relatively dilute concentration, for example between about 1% and about 12% by weight, a solvent for the MDA preferably is employed. If the salt is present in concentration above about 12 percent by weight, then no solvent need be employed, solid crystalline MDA being added directly to the salt solution.

A crystalline precipitate formed by interaction of the salt and the MDA is separated from the liquid phase, e.g., by filtration. The precipitate has a 3:1 mole ratio of MDA to salt and may be decomposed into its original constituents by adding a solvent such as acetone at an elevated temperature in the range of about 40° to 100°C., depending on the volatility of the solvent.

In the solvent method of preparing the complexes, a relatively dilute aqueous solution (1 to 12 percent by weight salt) of a sodium or lithium salt selected from the group comprising the chloride, bromide, iodide, and nitrite may be mixed with a solution of 4,4'-methylenedianiline in a suitable solvent, e.g., methanol, at a temperature in the range from about 20° to 60°C. Under these conditions, the MDA reacts with the sodium or lithium salt to form a crystalline precipitate consisting of MDA and the salt in a 3:1 mole ratio. The crystalline precipitate is then separated from the mother liquid by filtration, decantation, centrifuging or other suitable operation.

In the method of preparation in which a more concentrated salt solution (more than about 12 percent by weight of salt) may be employed, solid crystalline MDA is added to the salt solution with agitation at a somewhat higher temperature in the range of from about 50° to 90°C. in an amount somewhat in excess of the stoichiometric quantity required to react with that amount of salt which is present in excess of about 12 percent by weight. Under these conditions 3 mols of MDA react with 1 mol of salt to form a crystalline precipitate which may be separated from the remaining solution by filtration, decantation, centrifuging or other suitable operation.

Complexes of other salts, such as sodium nitrite may be formed by substantially the same procedures outlined for the sodium chloride complexes.

Prior to the curing operation itself, mixing and/or milling of the urethane prepolymer with finedly divided particles of the complex is required. Typically, the complex particle size is about 1 to 150 microns, preferably 1 to 10 microns. Grinding of the complex can be accomplished in standard grinding equipment such as the fluid energy mill and vertical hammer mills employing air classification to remove ground material from the mill.

Mixing of the finely divided complex with liquid prepolymers can be accomplished in dough mixers, high-speed impeller mixers, paddle-type mixers and the like. For best results it is preferred that the mix formed in the foregoing types of mixers be further mixed (or the complex dispersed) by use of a three-roll mill such as is used in paint and ink manufacture. Improved dispersions can also be prepared in colloid mills. These various types of mixers and mills are described in "The Encyclopedia of Chemical Process Equipment", W. J. Mead. Reinhold (1964).

The complex may also be used in the form of a dispersion in an inert carrier liquid which is compatible with the polyurethane. Suitable liquids include aromatic ester plasticizers such as dioctyl phthalate and highly aromatic hydrocarbon oils such as Dutrex 739 oil, a product of Shell Oil Co. The use of such dispersions simplifies metering and reduces the time and energy required for adequately blending the complex with the polyurethane prepolymer. Use of such dispersions is generally preferred.

In the use of a solid type polyurethane polymer or gum which is to be cured, the complex may be dispersed on a rubber mill or in an internal mixer (a Banbury Mixer). Once the gum has been banded on the mill or broken down in the internal mixer, the finely ground complex or its dispersion in an inert carrier can be added directly and milling or mixing continued until a uniform dispersion has been prepared.

In mixing the complex or its dispersion with either fluid prepolymers or millable gums the temperature must be kept below the decomposition point of the complex in order to avoid the possibility of premature curing. In the present process, the decomposition point of the complex is a function of the particular complex being used and the polymer in which the complex is dispersed. For isocyanato-terminated urethane prepolymers and the sodium chloride complex of methylene dianiline, mixing should be performed below 80°C., amd preferably below about 50°C.

It is essential that the proportions of prepolymer and amine complex be adjusted such that the NCO/NH$_2$ ratio of greater than one. In practice it is preferred thatt the NCO/NH$_2$ ratio range from about 1.10/1.00 to about 1.03/1.00 with a ratio of about 1.05/1.00 being especially preferred. While not preferred, ratios of 1.10/1.00 up to about 1.30/1.00 can be used.

The temperature to be utilized during the curing of urethanes will be about 90°–190°C. Temperature is not particularly critical but it must be above the temperature at which the complex dissociates in the system being cured; this temperature will also vary with each particular complex. The complex between sodium chloride and 4,4'-methylenedianiline begins to dissociate at a significant rate at about 90°C. in a urethane system.

Full curing will ordinarily take about 1 minute to 24 hours depending on the temperature for urethane when utilizing the MDA/sodium chloride complex. Preferred curing conditions range from about 1 minute to 12 hours, most preferably 1 minute to 5 minutes at temperatures ranging from about 90°–190°C. At these preferred curing temperatures sufficient cure to permit demolding occurs within about 5 seconds to 5 minutes because of the high reactivity of the MDA once it has been liberated from the complex. In the present process, the high reactivity of MDA becomes advantageous, whereas this reactivity prevented any practical use of MDA by prior art curing procedures in which gelation occurred before uniform mixing of free MDA and prepolymer could be accomplished. The present process provides unlimited time for mixing prolonged storage of the mixture, and ample time for filling the most complex of molds, coupled with almost instant gelation permitting demolding as soon as the mixture is heated.

It is believed that the reactions which take place in the present curing process are identical to those which occur when MCA is used as a curing agent by prior art curing procedures. Conventional curing equipment and curing procedures can be used in the present case.

The use of 4,4'-methylene dianiline salt complex as a curing agent permits the use of a novel processing procedure which can be described as liquid injection molding. The process involves rapidly injecting a liquid mixture of complex dispersed in an isocyanate-terminated prepolymer into a mold maintained at a temperature within the range of 135°–195°C. The liquid is injected with sufficient pressure to permit filling the mold before gelation prevents further flow. Ideally, sufficient pressure is also employed to prevent dissolved gases in the liquid from forming bubbles so as to avoid the degassing step usually required in curing prepolymers. It should be noted that the pressures required, i.e., usually 100–500 psi, are far below those required for conventional injection molding and thus relatively inexpensive molds and mold clamps can be used. Because a relatively high mold temperature is maintained at all times during the molding cycle, demolding can be accomplished generally within 3 minutes and preferably in less than 2 minutes.

One-shot preparation of polyurethanes for use in this invention involves simultaneous mixing and reacting of one or more polyols, one or more polyisocyanates and the MDA-salt complex. For convenience, the complex is preferably used in the form of a dispersion in an inert liquid carrier as described hereinbefore. As the reactions involved are quite exothermic and rapid, it is desirable to mix at the lowest possible temperature in a low hold-up mixer and to direct the resulting mixture directly to molds, preferably by a procedure such as the liquid injection molding process just described. If direct molding is not feasible, the mixture issuing from the mixer which thickens to a paste almost immediately can be formed by compression molding. In some instances it may be desirable to use a urethane-forming catalyst such as dibutyltin dilaurate to assist in balancing the reaction rate of urethane formation with the very rapid reaction of MDA and isocyanate.

The same raw materials are employed in the one-shot process as were described previously with respect to the prepolymer process.

This invention is intended to include the use of any flexible paint or coating which would adhere to the polyurethane. Preferred coatings include the acrylic enamels, alkyd enamels, urethane lacquers and two-part urethane enamels.

The coatings may be applied by any conventional method such as spraying, dipping or painting with a brush or roller; needless to say, this is not critical. The coating itself should be sufficiently thick to satisfy the purpose for which it is intended. Traditionally, a coating of 0.1–10 mils will be sufficient although variations from this is permissible within the scope of the instant invention. If more than one coat of finish is to be applied, the first coat or undercoat need not be the same as the finish coat.

The preferred coating is a cross-linked thermosetting acrylic enamel; wherein the enamel comprises 70–95% by weight of an acrylic polymer and 5–30% by weight of a compatible cross-linking agent. Specifically, the acrylic polymer of the coating composition used in this invention contains 19–44% by weight, based on the acrylic polymer, of an alkyl methacrylate that has 1–4 carbons in the alkyl group or styrene or a mixture of the alkyl methacrylate and styrene. Typical alkyl methacrylates which can be used are methyl methacrylate, ethyl methacrylate, propyl methacrylate, isopropyl methacrylate, butyl methacrylate, isobutyl methacrylate and the like. Preferably, the acrylic polymer contains 20 to 32% by weight of methyl methacrylate.

The acrylic polymer also contains 50–75% by weight, based on the weight of the acrylic polymer, of an alkyl methacrylate that has 6–12 carbon atoms in the alkyl group, or an alkyl acrylate that has 2–12 carbon atoms in the alkyl group or a mixture of the alkyl methacrylate and the alkyl acrylate. Typical alkyl methacrylates that can be used are hexyl methacrylate, 2-ethylhexyl methacrylate, octyl methacrylate, nonyl methacrylate, decyl methacrylate, and lauryl methacrylate. Typical alkyl acrylates that can be used are ethyl acrylate, propyl acrylate, butyl acrylate, isobutyl acrylate, hexyl acrylate, 2-ethylhexyl acrylate, octyl acrylate, nonyl acrylate, decyl acrylate, lauryl acrylate and the like. Preferably, the acrylic polymer contains 55 to 65% by weight of an alkyl acrylate having 2–8 carbon atoms in the alkyl group, preferably butyl acrylate.

The acrylate polymer contains 5–20% by weight, preferably 8–12% by weight, of a hydroxyalkyl acrylate or a hydroxyalkyl methacrylate or a mixture thereof that has 2–4 carbon atoms in the alkyl groups. Typical compounds of this type are hydroxyethyl acrylate, hydroxypropyl acrylate, hydroxybutyl acrylate, hydroxyethyl methacrylate, hydroxypropyl methacrylate, hydroxybutyl methacrylate and the like. Hydroxyethyl acrylate is preferred.

The acrylic polymer contains 1–20% by weight of an α, β-ethylenically unsaturated carboxylic acid, and preferably 1–5% by weight of the acid. Typical acids are acrylic acid, methacrylic acid, itaconic acid, crotonic acid, ethacrylic acid, propyl acrylic acid, and the like. Preferred are methacrylic acid and acrylic acid.

The following is one preferred acrylic polymer:

| | |
|---|---|
| 20 to 32% | by weight of methyl methacrylate, |
| 55 to 65% | by weight of butyl acrylate, |
| 8 to 12% | by weight of hydroxyethyl acrylate, |
| 1 to 5% | by weight of acrylic acid or methacrylic acid. |

One particularly preferred polymer that gives a high quality finish is 61% butyl acrylate, 26% methyl methacrylate, 10% 2-hydroxyethyl acrylate and 3% acrylic acid.

A blend of hard and soft acrylic polymers can be used in the acrylic enamel.

The cross-linking agent of the coating composition used in this invention is compatable with the acrylic polymer and can either be an alkylated melamine-formaldehyde resin or a polyisocyanate. Typical alkylated melamine-formaldehyde resins have 1–8 carbon atoms in the alkyl group and are resins that are well known in the art. These resin are prepared by conventional techniques in which a lower alkyl alcohol such as methanol, ethanol, butanol, isobutanol, propanol, isopropanol, hexanol, 2-ethyl hexanol and the like is reacted with a melamine-formaldehyde to provide pendent alkoxy groups.

Preferred melamine resins that are used are butylated melamine-formaldehyde resins, methylated/butylated melamine-formaldehyde resins and hexa(methoxymethyl) melamine.

The alkyd enamels or resins are usually prepared by heating a polycarboxylic acid component, a polyol component, and an oil component with or without solvent at a temperature less than about 300°C. until an alkyd resin having the desired properties is obtained. Typically such alkyd resins have an oil length of about 30–60, an acid number of less than 20, and 2–8% of unreacted hydroxyl. Oil length means the percent by weight of fatty oil acid used in preparing the resin calculated as triglyceride and based on the total weight of the resin. Percent of unreacted hydroxyl means the percent by weight of glycerol, based on the total weight of resin, which has an amount of unreacted hydroxyl groups equivalent to that of the resin. As is conventional in the coating art, the unreacted hydroxyl and oil length are based on glycerol, whether or not glycerol is used as the polyol. Acid number is the number of milligrams of potassium hydroxide necessary to neutralize the acidity of 1 gram of alkyd resin.

Typical polycarboxylic acids which may be used include phthalic acid or anhydride, oxalic acid, succinic acid and glutaric acid.

A typical polyol which would be useful would be glycerol, ethylene glycol, dimethylene glycol and tetramethylene glycol.

Illustrative oil components are, for example, drying oils such as dehydrated castor oil, tung oil, and linseed oil, or semi-drying oils such soybean oil, etc.

Extensive discussion of the alkyd resins is to be found in U.S. Pats. Nos. 2,956,902; 2,988,524; 2,857,344 and 3,390,206, the disclosures of which are herein incorporated by reference.

It should be noted that an enamel is based on a cross-linked polymer and a lacquer is based on a straight-chain polymer. Urethane lacquers and enamels derived from aliphatic (including cycloaliphatic) polyisocyanates can also be used as coatings in the instant invention. Preferred polyisocyanates include 4,4'- methylenebis(cyclohexyl isocyanate), hexamethylene, diisocyanate, m-xylylene diisocyanate, isophorone diisocyanate and 1-methyl-2,4-(2,6) cyclohexyl diisocyanate. Urethane lacquers are usually formed by chain-extension of difunctional aliphatic isocyanate terminated prepolymers with aliphatic diamines such as hexamethylene diamine, ethylene diamine, hydrazine and methylenebis(cyclohexyl amine). A description of these lacquers is contained in U.S. Pat. No. 3,401,143 to Goodyear Tire and Rubber Co. Two-part urethane enamels are generally prepared by mixing one part consisting of one or more polyols with a second part of a polyisocyanate or isocyanate-terminated prepolymer. The overall functionality of the material employed in the two parts should be greater than 2 to provide cross-linking.

A discussion of isocyanate coatings including those intended to be covered in the instant invention may be found in the Kirk-Othmer Encyclopedia of Chemical Technology, Second Edition (1970) John Wiley and Sons, Vol. 21, pages 100–104; the disclosure included therein is herein incorporated by reference.

The resulting coated or painted polyurethane product is extremely non-discoloring; in fact, after a period of accelerated aging corresponding to about a year little if any discoloration is noted. The colors may be added to the coatings or paint by any conventional method.

The resulting product is of particular value for use with automobile accessory parts. In particular, exterior automotive trim.

In the following examples all parts and percentages are by weight unless otherwise indicated.

EXAMPLES

The following ASTM methods are employed in determining the properties of the elastomers prepared in the examples.

| | |
|---|---|
| Tensile Strength | D 412 |
| Elongation at Break | D 412 |
| Modulus, 100% | D 412 |
| Modulus, 300% | D 412 |
| Tear Strength | D 470 |
| Compression Set | D 395 |
| Bashore Resilience | D 1054 |
| Hardness, Durometer A | D 676 |
| Hardness Durometer D | D 1484 |
| NBS Abrasion Index | D 394 |
| Youngs Modulus | E 111 |
| Brittle Point | D 746 |
| Flex Modulus | D 797 |

EXAMPLE 1

An isocyanato-terminated polyurethane is prepared from a mixture of 0.4 moles of polypropylene glycol of molecular weight 2,000, 0.6 moles of dipropylene glycol and 1.73 moles of toluene 2,4-diisocyanate by heating for 4 hours at 80°C. The resultant product has an NCO content of 5.2% by weight.

To the prepolymer, maintained at a temperature of 70°C,, is added with agitation 95% of the stoichiometric amount required for complete reaction of the sodium chloride complex of methylene dianiline (MDA)$_3$. NAC$_1$ dispersed in an equal amount by weight of dioctyl phthalate. The temperature of the MDA complex/DOP dispersion is 25°C., at the time of addition.

After thorough mixing, the material is degassed at an absolute pressure of 0.5 to 5 mm of mercury. Degassing is complete when vigorous foaming stops.

When degassing is complete, the mix is cast into a compression mold maintained at 177°C. and pressure applied and held until the reactants have set. Hold time in the mold is about 2 minutes, after which time the thermoset polyurethane is removed. After curing at 120°C. for 2 hours, the thermoset urethane has the following properties:

| | | | |
|---|---|---|---|
| Hardness, Durometer D | | | 35 |
| Tensile Strength, psi | | | 3060 |
| Tear Strength, pli, | Room Temp. | Die'C' | 355 |
| | 100°C | graves D624 | 179 |
| Elongation at Break, % | | | 540 |
| Compression Set, 22 hrs. at 158°F. at 25% Deflection, % | | | 55.25 |
| Youngs Modulus, | Room Temp. | psi | 4750 |
| | −20°F. | psi | 20,100 |
| | −40°F. | psi | 34,500 |
| Brittle Point, °F. | | | −65 |
| Flex Modulus, psi | | | 7841 |
| NBX Abrasion Index | | | 183 |
| Bashore Rebound, % | | | 34 |

The article is then solvent-wiped with methyl ethyl ketone and a nominal 1 mm. thick spray coating of Durethane 100 enamel primer, a product of the PPG Co. which is a polyester urethane, hydroxy terminated and cross-linked with nitrogen resin, is applied. The primer coat is cured for 20 min. at 120°C. After that time, a top coat of flexible acrylic enamel at a nominal thickness of 1.81 mm. is spray-applied and cured for 40 min. at 120°C.

The resultant painted article is conditioned for 3 days at room temperature and 50% R.M. No discoloration of the painted surface is observed after either 100 hours UV exposure or 400 hours Weather-O-Meter (ASTM-D-750) exposure.

EXAMPLE 2

A prepolymer prepared by reacting 2 moles of toluene 2,4-diisocyanate with 1 mole of polytetramethylene ether glycol having a molecular weight of 980 is thoroughly mixed at an absolute pressure of 0.5 to 5 mm. of mercury for 1 hour at 50°C. with 92% of the stoichiometric amount required for complete reaction of the sodium chloride complex of methylene dianiline (MDA)$_3$.NaCl dispersed in an equal amount by weight of dioctyl phthalate.

After mixing, the material is cast into a compression mold at room temperature. Pressure is then applied to the mold for 10 min., during which time heat is applied to the mold through the platens of the press which are maintained at a temperature of 150°C. After removal of the thermoset polyurethane it is cured at 110°C. for 1 hour and then conditioned for 7 days at room temperature and 50% R.N. The thermoset urethane has the following properties:

| | |
|---|---|
| Hardness, Durometer A | 92 |
| 100% Modulus, psi | 1050 |
| 300% Modulus, psi | 1950 |
| Tensile Strength, psi | 4875 |
| Elongation at Break, % | 475 |
| Tear Strength, pli | 90 |
| Compression Set, 22 hrs. at 158°F. at 25% Deflection, % | 57 |
| NBS Abrasion Index | 690 |
| Bashore Rebound, % | 39 |

The article is then solvent-wiped with methyl ethyl ketone and painted in exactly the same manner as that described in Example 1.

The resultant painted article is conditioned for 3 days at room temperature and 50% R.N. No discoloration of the painted surface is observed after either 100 hours UV exposure or 400 hours Weather-O-Meter.

What is claimed is:

1. A process for preparing a substantially nondiscoloring painted polyurethane part which consists essentially of heat-curing an NCO-terminated polyurethane prepolymer with a complex of 4,4'-methylene dianiline and a salt, the salt being selected from the group consisting of sodium chloride, sodium bromide, sodium iodide, sodium nitrite, lithium chloride, lithium bromide, lithium iodide, lithium nitrite, and sodium cyanide, the ratio of said dianiline to said salt in said complex being 3 moles to 1 mole, the proportions of prepolymer and complex being adjusted so that the $NCO/NH_2$ ratio is greater than one, thereby forming a polyurethane, and painting or coating said polyurethane with a flexible paint or coating.

2. The process of claim 1 wherein said curing takes place at a temperature of about 90°–180°C.

3. The process of claim 1 wherein said complex is derived from 4,4'-methylene dianiline and sodium chloride.

4. The process of claim 1 wherein said paint or coating is selected from the group consisting of acrylic enamels, alkyd enamels, urethane lacquers and two-part urethane enamels.

5. The process of claim 1 wherein said paint or coating is an acrylic enamel.

6. A process for preparing a substantially nondiscoloring painted polyurethane part which consists essentially of simultaneously mixing and reacting at least one polyol, at least one polyisocyanate and a complex of 4,4'-methylene dianiline and a salt, the salt being selected from the group consisting of sodium chloride, sodium bromide, sodium iodide, sodium nitrite, lithium chloride, lithium bromide, lithium iodide, lithium nitrite, and sodium cyanide, the ratio of said dianiline to said salt in said complex being 3 moles to 1 mole, the proportion of isocyanate and complex being adjusted so the $NCO/NH_2$ ratio is greater than one, thereby forming a polyurethane, and painting or coating said polyurethane with a flexible paint or coating.

7. The process of claim 6 wherein said curing takes place at a temperature of about 90°–180°C.

8. The process of claim 6 wherein said complex is derived from 4,4'-methylene dianiline and sodium chloride.

9. A product prepared by the process of claim 1.

10. An automobile accessory part molded from the composition of claim 1.

* * * * *